United States Patent
Kim et al.

(10) Patent No.: US 8,153,312 B2
(45) Date of Patent: Apr. 10, 2012

(54) FUEL CELL SYSTEM

(75) Inventors: Ju-Yong Kim, Suwon-si (KR); Sung-Chul Lee, Suwon-si (KR); Chan-Ho Lee, Suwon-si (KR); Jin-Goo Ahn, Suwon-si (KR); Jin-Kwang Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1444 days.

(21) Appl. No.: 11/711,010

(22) Filed: Feb. 27, 2007

(65) Prior Publication Data

US 2007/0202368 A1  Aug. 30, 2007

(30) Foreign Application Priority Data

Feb. 28, 2006  (KR) .................. 10-2006-0019479

(51) Int. Cl.
*H01M 8/06*  (2006.01)
(52) U.S. Cl. .................. 429/425; 429/439
(58) Field of Classification Search .......... 429/425, 429/439
See application file for complete search history.

(56) References Cited

U.S. PATENT DOCUMENTS

| | | |
|---|---|---|
| 2002/0106540 A1 | 8/2002 | Shioya |
| 2003/0029650 A1* | 2/2003 | Baumert et al. ............ 180/65.1 |
| 2004/0105789 A1 | 6/2004 | Yamamoto |
| 2004/0265658 A1* | 12/2004 | de Vaal et al. .............. 429/22 |
| 2007/0199746 A1* | 8/2007 | Reid et al. ............... 180/65.3 |

FOREIGN PATENT DOCUMENTS

| | | |
|---|---|---|
| JP | 05-104945 | 4/1993 |
| JP | 2001-239847 | 9/2001 |
| JP | 2003-095609 | 4/2003 |
| JP | 2003-148696 | 5/2003 |
| JP | 2004-232777 | 8/2004 |
| JP | 2004-333027 | 11/2004 |
| JP | 2005-044551 | 2/2005 |

OTHER PUBLICATIONS

European Search Report corresponding to European Patent Application No. 07103185.0, issued on Jun. 26, 2007.
Japanese Office Action dated Sep. 8, 2010 for a corresponding Japanese Patent Publication No. 2007-047724 and Request for Entry of the Accompanying Office Action herewith.

* cited by examiner

*Primary Examiner* — Patrick Ryan
*Assistant Examiner* — Ladan Mohaddes
(74) *Attorney, Agent, or Firm* — Robert E. Bushnell, Esq.

(57) ABSTRACT

A fuel cell system includes a fuel cell body to generate electrical energy using a reaction of hydrogen and oxygen; a reformer to generate a reformed gas containing hydrogen by reforming fuel and to supply the reformed gas to the fuel cell body; a fuel tank to store the fuel in a partially liquefied state and to supply the fuel to the reformer; a case to encase the fuel cell body and the reformer; and a refrigeration unit attached to the case to store ambient air of the fuel tank, the ambient air of the fuel tank being cooled by latent heat of vaporization of the fuel.

20 Claims, 5 Drawing Sheets

FUEL CELL SYSTEM

CLAIM OF PRIORITY

This application makes reference to, incorporates the same herein, and claims all benefits accruing under 35 U.S.C. §119 from an application for FUEL CELL SYSTEM earlier filed in the Korean Intellectual Property Office on the 28$^{th}$ day of Feb. 2006 and there duly assigned Serial No. 10-2006-0019479.

BACKGROUND OF THE INVENTION

1. Field of the Invention

The present invention relates to a fuel cell system. More particularly, the present invention relates to a fuel cell system using a liquefied gas fuel, such as butane.

2. Description of the Related Art

A fuel cell is a generator that generates electrical energy by using a fuel and an oxidant gas.

Fuel cells can be broadly divided into polymer electrolyte membrane fuel cells and direct oxidation membrane fuel cells.

A system that employs polymer electrolyte membrane fuel cells includes a stack, a reformer, a fuel supply, and an oxidant gas supply. The stack includes a plurality of fuel cells consecutively arranged therein; the reformer generates a reformed gas by reforming a fuel; the fuel supply supplies the fuel to the reformer; and the oxidant gas supply supplies the oxidant gas to the stack.

When the fuel is supplied to the reformer, the reformer reforms the fuel and generates reformed gas. When the reformed gas and the oxidant gas are supplied to the stack, electrical energy is generated in the stack by an electrochemical reaction of the reformed gas and the oxidant gas.

Recently, a fuel cell system using a liquefied gas fuel that can be easily purchased at the market has been suggested.

Butane has a relatively low boiling point and can be easily liquefied with a relatively low pressure, and therefore, butane can be contained in a partially liquefied state in a fuel tank and supplied to the reformer.

However, since the fuel is stored in a partially liquefied state in the fuel tank in the fuel cell system, the fuel is vaporized by heat around the fuel tank and is then emitted.

Accordingly, the temperature of the fuel tank is decreased due to latent heat of vaporization, and when the temperature is lower than a boiling point of the fuel, the internal temperature of the fuel tank is decreased, thereby causing deterioration in vaporization characteristics of the fuel.

Therefore, the fuel tank cannot sufficiently provide fuel to the reformer since the amount of vaporized liquefied gas fuel has been reduced.

SUMMARY OF THE INVENTION

The present invention has been made in an effort to provide a fuel cell system having improved vaporization capability of liquefied gas fuel stored in a fuel tank by maximizing heat energy supplied to the fuel tank, and storing ambient air of the fuel tank that is cooled by the latent heat of vaporization.

An embodiment of a fuel cell system in accordance with the present invention includes: a fuel cell body to generate electrical energy using a reaction of hydrogen and oxygen; a reformer to generate a reformed gas containing hydrogen by reforming fuel and to supply the reformed gas to the fuel cell body; a fuel tank to store the fuel in a partially liquefied state and to supply the fuel to the reformer; a case to encase the fuel cell body and the reformer; and a refrigeration unit attached to the case to store ambient air of the fuel tank, the ambient air of the fuel tank being cooled by latent heat of vaporization of the fuel.

The refrigeration unit preferably includes: a first body having a plurality of vent holes and having an accommodation space to accommodate the fuel tank; and a second body connected to the first body and having a cool air storing space communicating with the first body.

The refrigeration unit preferably includes a cooling fan arranged within an aperture between the first and second bodies, the cooling fan drawing the cool air into the cool air storing space.

The first body preferably includes a mounting member to mount the fuel tank thereon. The first body preferably includes a door to selectively open the accommodation space.

The fuel cell system preferably further includes a communication aperture, arranged between the first and second bodies, to facilitate the accommodation space and the cool air storing space communicating with each other, the cooling fan being arranged within the communication aperture.

The second body preferably includes a door to selectively open the cool air storing space.

The refrigeration unit preferably further includes a refrigeration cycle device to generate cool air using electrical energy generated by the fuel cell body. The refrigeration unit preferably further includes a refrigeration cycle device, arranged inside the cool air storing space of the second body, to generate cool air using electrical energy generated by the fuel cell body.

The fuel cell body preferably includes at least one electric generator including a Membrane Electrode Assembly (MEA) and separators closely arranged on lateral sides of the MEA to center the MEA. The fuel cell body preferably includes a stack including plurality of consecutively arranged electric generators.

The fuel cell system preferably supplies electrical power as a portable power supply.

The fuel preferably includes a liquefied gas, the liquified gas being vaporized at room temperature. The fuel preferably includes at least one of a group of gases consisting of methane, ethane, propane, and butane.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE EMBODIMENTS

The present invention is described more fully hereinafter with reference to the accompanying drawings, in which exemplary embodiments of the present invention are shown. As those skilled in the art would realize, the described embodiments may be modified in various different ways, all without departing from the spirit or scope of the present invention.

Figure 1:
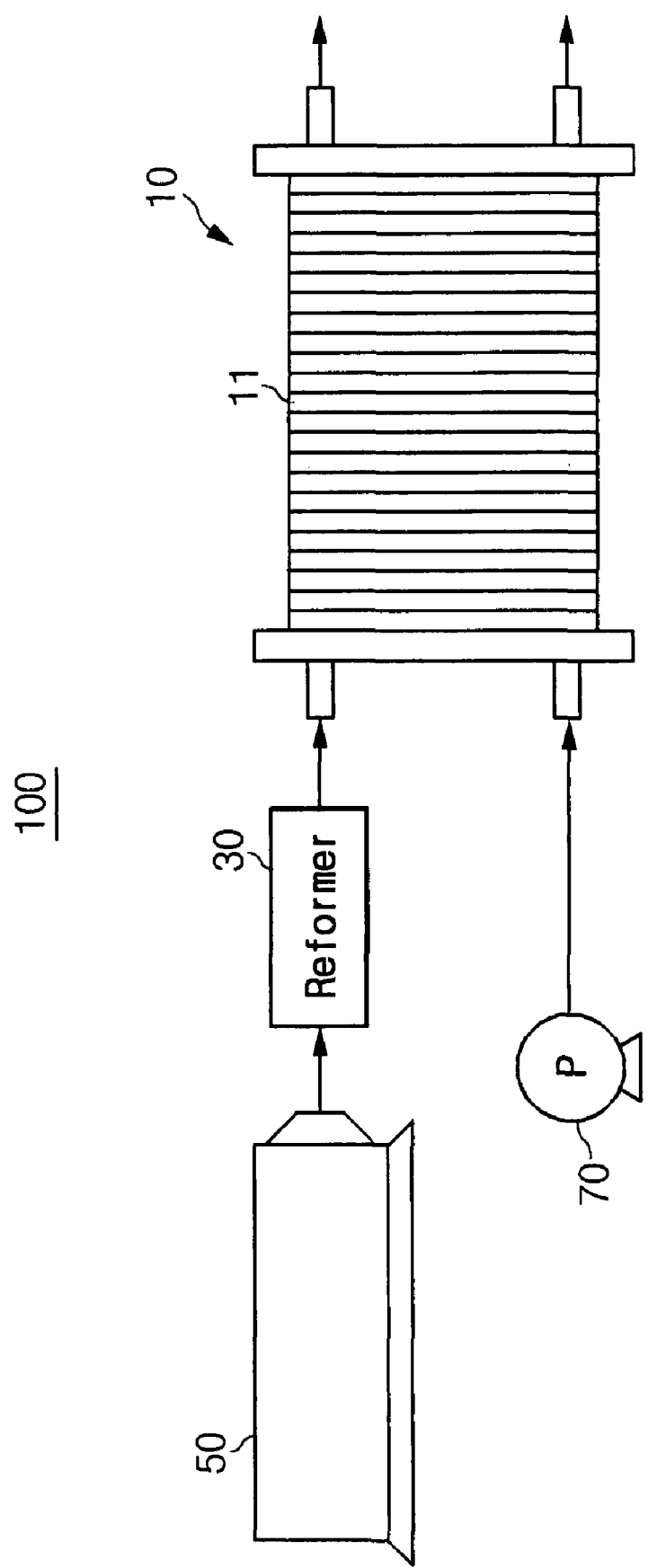
FIG. 1 is a block diagram of a fuel cell system according to an exemplary embodiment of the present invention.

FIG. 1 is a block diagram of a fuel cell system according to an exemplary embodiment of the present invention.

As shown in FIG. 1, the fuel cell system 100 according to the exemplary embodiment of the present invention is a generating system that generates electrical energy by using a fuel and an oxidant gas, and can be used as a portable power supply.

The fuel cell system 100 can include polymer electrolyte membrane fuel cells that reforms fuel to generate a reformed gas rich in hydrogen and that generates electrical energy by using an oxidation reaction of the reformed gas and a reduction reaction of an oxidant gas.

The fuel is partially liquefied and compressed and is stored in a container, and may include a liquefied gas that is vaporized at room temperature. The fuel may be a liquefied gas, such as a hydrocarbon family gas (e.g., methane, ethane, propane, and butane).

According to the present exemplary embodiment of the present invention, a portable fuel cell system uses butane as the fuel.

Since butane that vaporizes at room temperature is sold in the market by being stored in a liquid state in a container, butane is an appropriate fuel for a portable fuel cell.

The fuel cell system 100 may use oxygen gas stored in a separate storage unit as an oxidant gas, and may use air that contains oxygen as the oxidant gas. However, air containing oxygen gas will be used as the oxidant gas in the following exemplary embodiment of the present invention.

Such a fuel cell system 100 includes a fuel cell body 10 including polymer electrolyte membrane fuel cells, a reformer 30 for reforming fuel, a fuel tank 50 for supplying fuel to the reformer 30, and an air pump 70 for supplying air to the fuel cell body 10.

The fuel cell body 10 is connected to the reformer 30 and the air pump 70. The fuel cell body 10 includes an electric generator 11 that receives a reformed gas from the reformer 30 and air from the air pump 70 and generates electrical energy by using an electrical-chemical reaction of hydrogen in the reformed gas and oxygen in the air.

The fuel cell body 10 may include a plurality of electric generators 11 that are consecutively disposed to form a stack according to the exemplary embodiment of the present invention.

Figure 2:
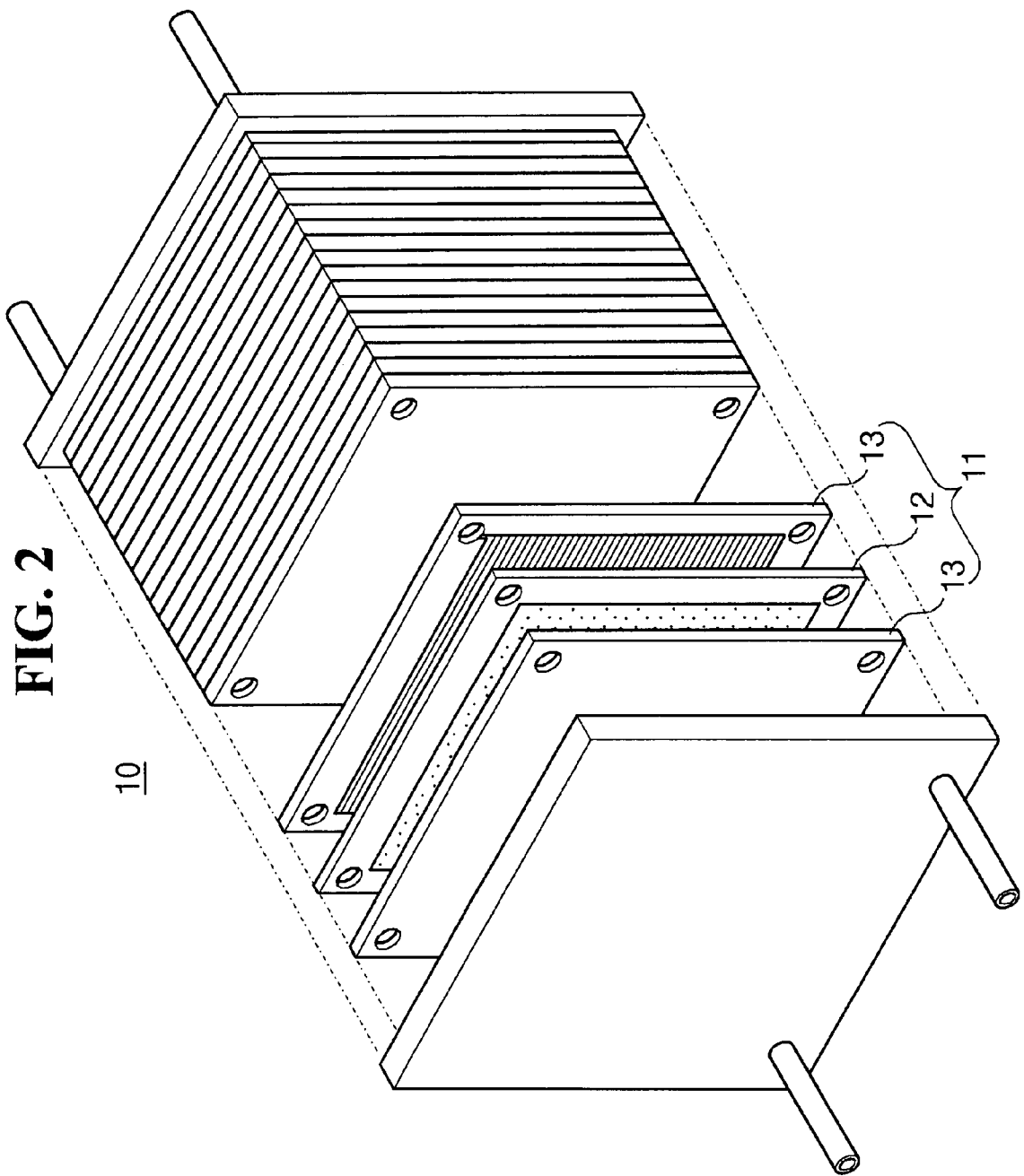
FIG. 2 is an exploded perspective view of the fuel cell system of FIG. 1.

FIG. 2 is an exploded perspective view of the fuel cell body of FIG. 1.

As shown in FIG. 2, the fuel cell body 10 according to the present exemplary embodiment is formed as a stack consisting of a plurality of electric generators 11.

Each electric generator 11 includes a Membrane-Electrode Assembly (MEA) 12 and separators 13. Separators 13 are closely disposed on both sides of the MEA 12, centering the MEA 12.

The MEA 12 has an anode electrode formed on a first side and a cathode electrode formed on a second side thereof, and an electrolyte membrane is interposed between the anode electrode and the cathode electrode.

The anode electrode divides hydrogen in a reformed gas into electrons and protons by using an oxidation reaction, the electrolyte membrane moves protons to the cathode electrode, and the cathode electrode generates moisture by using a reduction reaction of the electrons and the protons received from the anode electrode and oxygen in the air.

The separator 13 separately supplies the reformed gas to the anode electrode of the MEA 12 and supplies air to the cathode electrode of the MEA 12.

In addition, the separator 13 performs as a conductor to serially couple the anode electrodes and the cathode electrodes of the MEA 12.

As shown in FIG. 1, the reformer 30 according to the present exemplary embodiment generates a reformed gas containing hydrogen from a fuel by using a reforming reaction of the fuel, such as a catalyst reaction, that is, steam reforming, partial oxidation, or an auto-thermal reaction, for example. The reformer 30 may be connected to the fuel cell body 10 by a pipe.

Such a reformer 30 is provided as a typical reformer used in a polymer electrolyte membrane fuel cell system, and therefore a further description thereof has been omitted.

In the present exemplary embodiment, the fuel tank 50 is provided as a cylindrical can container connected with the reformer 30 by a pipe and storing fuel in a partially liquefied state by maintaining compression of the fuel.

Since the fuel is stored in the liquefied and compressed state in the fuel tank 50, it is vaporized by the temperature around the fuel tank 50 and emitted by internal pressure of the fuel tank 50.

Therefore, the latent heat of vaporization of the fuel decreases the surface temperature of the fuel tank 50 since the fuel is vaporized by the temperature around the fuel tank 50, so the air around the tank 50 is cooled.

In the present exemplary embodiment, the air pump 70 pumps air, compresses the pumped air, and delivers the compressed air to the fuel cell body 10, and is connected to the fuel cell body 10 through a pipe.

Figure 3:
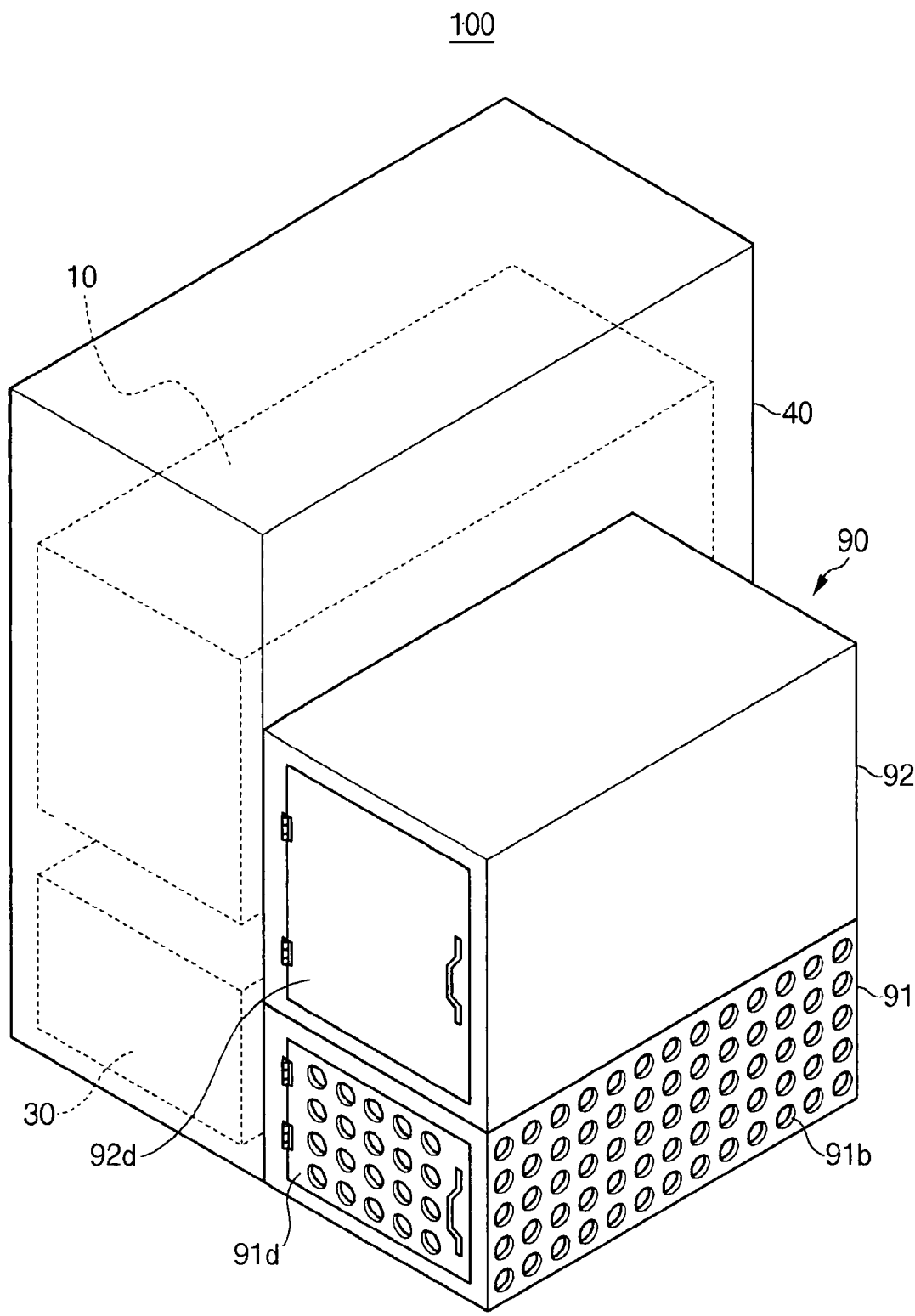
FIG. 3 is a perspective view of an exterior of the fuel cell system according to the exemplary embodiment of the present invention.
Figure 4:
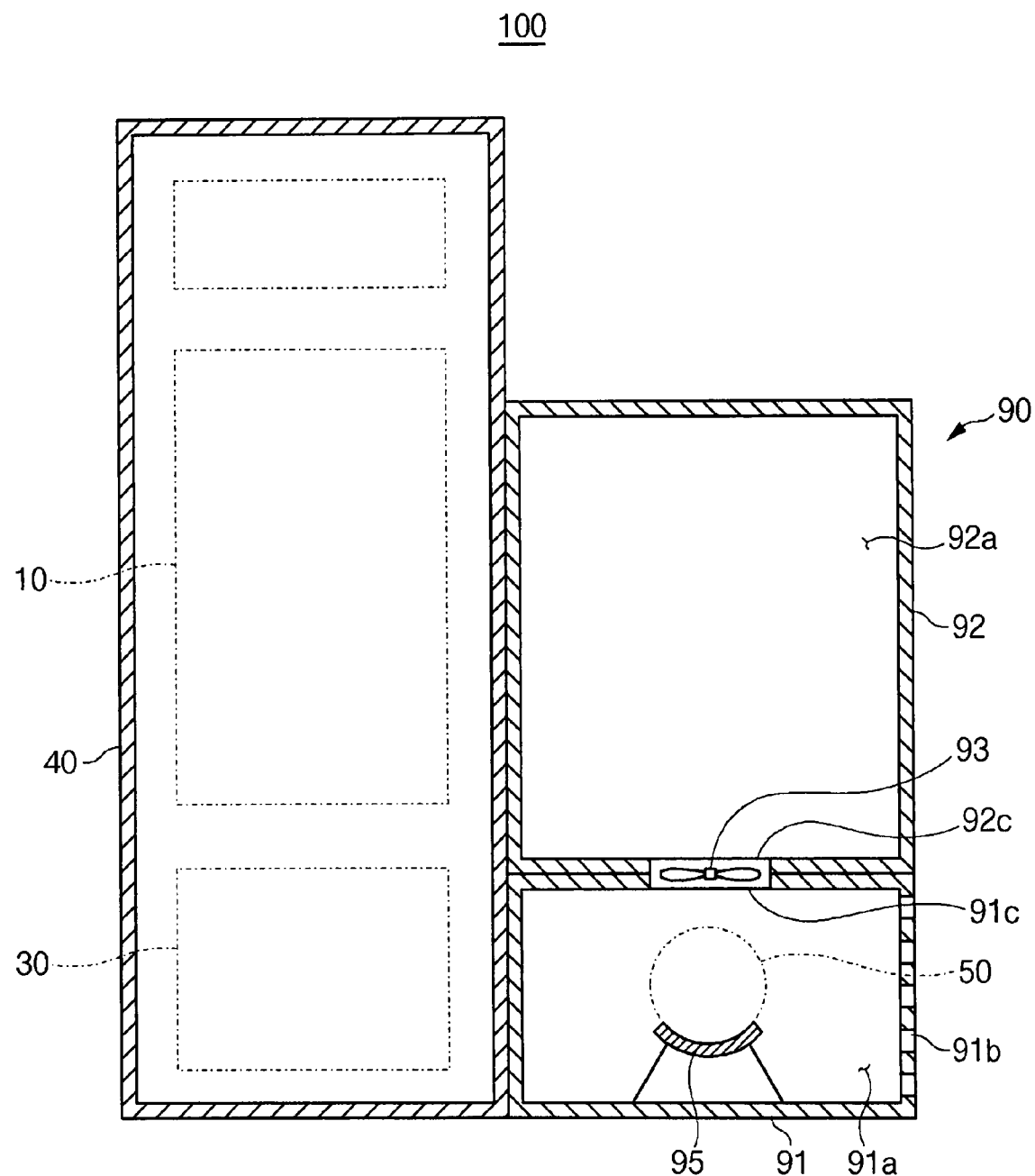
FIG. 4 is a cross-sectional view of the fuel cell system of FIG. 3.

FIG. 3 is a perspective view of an exterior of the fuel cell system according to the exemplary embodiment of the present invention, and FIG. 4 is a cross-sectional view of the fuel cell system of FIG. 3.

As shown in FIG. 3 and FIG. 4, the fuel cell system 100 according to another exemplary embodiment of the present invention includes a refrigeration unit 90 that is used as a cooling apparatus for storing ambient air of the fuel tank 50 that is cooled by the latent heat of vaporization of the fuel stored in the fuel tank 50. Hereinafter, the cooled ambient air of the fuel tank 50 is referred to as cool air.

In the present exemplary embodiment, the refrigeration unit 90 is installed in a casing member 40 that includes the fuel cell body 10 and the reformer 30.

The refrigeration unit 90 includes a first body 91 for accommodating the fuel tank 50, a second body 92 for storing ambient cool air of the fuel tank 50, and a cooling fan 93 disposed around a flue tube between the first body 91 and the second body 92.

The first body 91 is a case that forms an accommodation space 91a for accommodating the fuel tank 50. The first body 91 includes a plurality of vent holes 91b through which the accommodation space 91b can communicate with the outside of the first body 91. The first body 91 is fixed to an outer surface of the case member 40 by a bracket (not shown).

Furthermore, the fuel tank 50 installed in the accommodation space 91a of the first body 91 is connected to the reformer 30 provided inside the case member 40 by a pipe that passes through the first body and the case member 40.

In an upper side of the first body 91, a first vent hole 91c is provided for communication between the accommodation space 91a of the first body 91 and a cool air storing space 92a of the second body 92.

In addition, the accommodation space 91a of the first body 91 includes a mounting member 95 for mounting the fuel tank 50 thereon. The mounting member 95 is formed as a fixed bracket frame for fixing the fuel tank 50.

The fuel tank 50 can be supplied with predetermined heat energy since external air flows into the accommodation space 91a of the first body 91 through the vent holes 91b of the first body 91.

That is, when the fuel in the tank 50 is emitted, the surface temperature of the fuel tank 50 is decreased due to latent heat of vaporization of the fuel, and internal pressure of the fuel tank 50 is decreased when the surface temperature is lower than a boiling point so that the vaporization capability of the fuel deteriorates. Accordingly, the fuel tank 50 cannot efficiently provide fuel to the reformer 30.

Therefore, external air flows into the accommodation space 91a through the vent holes 91b in the present exemplary embodiment so as to provide heat energy to the fuel tank 50, thereby improving the vaporization capability of the fuel stored in the fuel tank 50.

In the present exemplary embodiment, the second body 92 is fixed to an outer surface of the case member 40 by a bracket (not shown).

The second body 92 stores ambient air (i.e., cool air) of the fuel tank 50, that is cooled by latent heat of vaporization of fuel in the fuel tank 50 in the accommodation space 91a of the first body 91, and can be provided as a case in which a beverage can or food can be disposed.

In more detail, the second body 92 includes the cool air storing space 92a for storing the cool air and goods (e.g., beverage can or food), and is connected to the first body 91.

A second vent hole 92c is formed in a bottom side of the second body 92, and the second vent hole 92c communicates with the first vent hole 91c. That is, the cool air storing space 92a of the second body 92 communicates with the accommodation space 91a through the first and second vent holes 91c and 92c.

In addition, the second body 92 may further have a heat insulator (not shown) on an inner surface of the second body 92; the heat insulator prevents the cool air stored in the cool air storing space 92a from being externally heated.

In the present exemplary embodiment, the cooling fan 93 is fixed in the vent holes 91c and 92c of the first and second bodies 91 and 92. The cooling fan 93 is closely disposed to the fuel tank 50 that is disposed in the accommodation space 91a of the first body 91.

Such a cooling fan 93 is a typical fan that draws ambient air of the fuel tank 50 that is cooled by the latent heat of vaporization of the gas fuel in the accommodation space 91a of the first body 91, and blows the cooled air into the cooling air storing space 92a of the second body 92.

The cooling fan 93 also draws external air into the accommodation space 91a through the vent holes 91b of the first body 91.

In FIG. 3, the reference numerals 91d and 92d respectively denote doors for selectively opening or closing the accommodation space 91a of the first body 91 and the cool air storing space 92a of the second body 92.

Operation of the fuel cell system 100 having the above-stated configuration according to the exemplary embodiment of the present invention is described in more detail as follows.

The fuel stored in a partially liquefied state in the fuel tank 50 is emitted after being vaporized by the ambient temperature of the fuel tank 50, and is then supplied to the reformer 30. Then, the reformer 30 generates a reformed gas containing hydrogen by using a reforming reaction of the fuel.

Subsequently, the reformer 30 supplies the reformed gas to the fuel cell body 10, and at the same time, the air pump 70 supplies air to the fuel cell body 10. Then, the fuel cell body 10 generates electrical energy by using an oxidation reaction of the reformed gas by the electric generators 11 and a reducing reaction of the oxygen.

Through this process, the fuel tank 50 stores fuel in a liquid state, and the fuel is emitted after being vaporized by the ambient heat of the fuel tank 50. Accordingly, the ambient air of the fuel tank 50 is quickly cooled by the latent heat of vaporization occurring in the accommodation space 91 of the first body 91.

The ambient air of the fuel tank 50 flows to the cool air storing space 92a of the second body 92 from the accommodation space 91a of the first body 91 when the cooling fan 93 is driven. The cool air stored in the cool air storing space 92a of the second body 92 cools predetermined goods disposed in the cool air storing space 92a.

In the above-described process, air is drawn into the accommodation space 91a through the vent holes 91b of the first body 91 and passes around the fuel tank 50.

Therefore, the fuel stored in the fuel tank 50 is vaporized by the heat energy of the external air. That is, internal pressure of the fuel tank 50 is increased by receiving the heat energy so that the vaporization capability of the fuel is increased, thereby efficiently supplying the fuel to the reformer 30.

The air drawn into the accommodation space 91a through the vent holes 91b of the first body 91 is quickly cooled around the fuel tank 50 since the fuel tank 50 takes the heat energy from the air.

The cool air is drawn into the cool air storing space 92a of the second body 92 from the accommodation space 91a of the first body 91 when the cooling fan 93 is driven.

Figure 5:
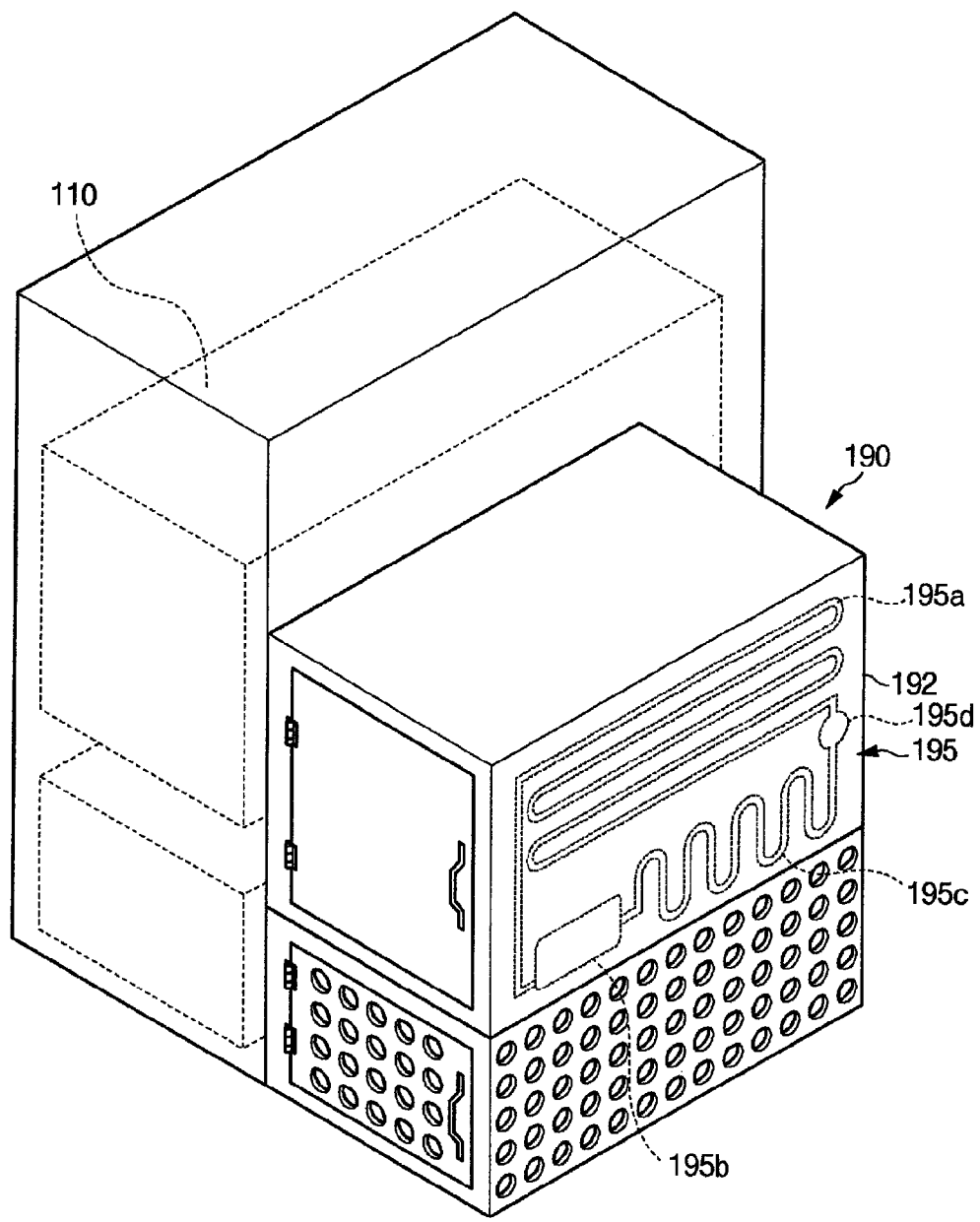
FIG. 5 is a perspective view of a fuel cell system according to another exemplary embodiment of the present invention.

FIG. 5 is a schematic perspective view of a fuel cell system according to another exemplary embodiment of the present invention.

As shown in FIG. 5, a fuel cell system 200 according to the present exemplary embodiment may include a refrigeration unit 190 having a refrigeration cycle device 195 that can additionally generate cool air by using electrical energy generated from a fuel cell body 110.

In the present exemplary embodiment, the refrigeration cycle device 195 is disposed inside the second body 192. It is preferable to dispose the refrigeration cycle device 195 on an inner wall of the second body 192. The refrigeration cycle device 195 is electrically coupled to an electrical output terminal of the fuel cell body 110.

The refrigeration cycle device 195 is provided as a typical refrigeration cycle device that includes an evaporator 195a, a compressor 195b, a condenser 195c, and an expansion valve 195d, and therefore, a further description thereof has been omitted.

Therefore, according to the present exemplary embodiment, the fuel cell body 110 has the refrigeration cycle device 195 driven by electrical energy so that the system 200 can additionally generate cool air by using the refrigeration cycle device 195 and store the cool air inside the second body 192.

Other configurational aspects of the fuel cell system 200 according to the present exemplary embodiment are the same as those of the previous exemplary embodiment, and therefore, a further description thereof has been omitted.

Although the fuel cell system is described as a portable power supply in the exemplary embodiments, the fuel cell system can be applied to a gas vehicle that uses a gas fuel.

In addition, the fuel tank is mounted in the case of the refrigerator unit according to the exemplary embodiments, but it may be separately provided rather than mounted inside the case.

According to the above-described exemplary embodiment of the present invention, the fuel cell system includes the refrigeration unit that stores ambient air of the fuel tank that is cooled by the latent heat of vaporization of the liquefied gas fuel, and therefore the fuel cell system can also be used as a portable refrigerator device that can store predetermined goods.

In addition, the fuel cell system can be used as a refrigeration device with a high refrigeration efficiency by including a refrigeration unit that can additionally generate cool air by using a refrigeration cycle device.

Furthermore, according to an exemplary embodiment of the present invention, heat energy can be supplied to the fuel tank while storing ambient cool air of the fuel tank so that the vaporization capability of the fuel in the fuel tank can be improved and the fuel can be efficiently supplied to the reformer. The system can be continuously driven by reliably supplying the liquefied gas fuel stored in the fuel tank, thereby driving the fuel cell system with a high efficiency.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A fuel cell system, comprising:
   a fuel cell body to generate electrical energy by using a reaction of hydrogen and oxygen;
   a reformer to generate a reformed gas containing the hydrogen by reforming a fuel and supplying the reformed gas to the fuel cell body;
   a case member to encase the fuel cell body and the reformer;
   a refrigeration unit attached to the case member and including a first body and a second body;
   a fuel tank arranged within the first body to store the fuel in a partially liquefied state, to supply the fuel to the reformer and to cool air within the first body by latent heat of vaporization of the fuel within the fuel tank;
   the second body to receive and store the air from the first body that has been cooled by the latent heat of vaporization of the fuel in the fuel tank.

2. The fuel cell system of claim 1, wherein the first body comprises:
   a first aperture that communicates with an exterior of the fuel cell system; and
   a second aperture that communicates with the second body.

3. The fuel cell system of claim 2, further comprising a cooling fan arranged within the second aperture to draw air that has been cooled by the latent heat of vaporization of the fuel within the fuel tank from the first body to the second body and to draw relatively warm air from an exterior of the fuel cell system into the first body to replace the cool air that has been drawn into the second body.

4. The fuel cell system of claim 1, wherein the first body comprises a mounting member to mount the fuel tank on the mounting member.

5. The fuel cell system of claim 1, wherein the first body comprises a door that selectively opens the accommodation space.

6. The fuel cell system of claim 1, wherein the refrigeration unit is separate and distinguished from the case member and the second body is separate and distinguished from the first body.

7. The fuel cell system of claim 1, wherein the second body comprises a door that selectively opens the cool air storing space.

8. The fuel cell system of claim 1, wherein the second body of the refrigeration unit further comprises a refrigeration cycle device that includes an evaporator, a compressor, a condenser and an expansion valve.

9. The fuel cell system of claim 8, wherein the refrigeration cycle device is powered by electrical energy generated by the fuel cell body.

10. The fuel cell system of claim 1, wherein the fuel cell body comprises at least one electric generator formed by a membrane electrode assembly (MEA) and separators closely disposed to lateral sides of the MEA, centering the MEA.

11. The fuel cell system of claim 10, wherein the fuel cell body comprises a plurality of electric generators consecutively disposed to form a stack.

12. The fuel cell system of claim 1, wherein the fuel cell system is provided as a portable power supply.

13. The fuel cell system of claim 1, wherein the fuel includes a liquefied gas that is vaporized at room temperature.

14. The fuel cell system of claim 13, wherein the fuel is mainly comprised of at least one material selected from a group consisting of methane, ethane, propane, and butane.

15. The fuel cell system of claim 1, wherein the first aperture comprises a plurality of apertures that expose an interior of the first body to an outside.

16. The fuel cell system of claim 1, wherein air within the second body is at a lower temperature than an exterior of the fuel cell system.

17. A fuel cell system comprising:
   a fuel cell body for generating electrical energy by using a reaction of hydrogen and oxygen;
   a reformer for generating a reformed gas containing the hydrogen by reforming fuel and supplying the reformed gas to the fuel cell body;
   a fuel tank for storing the fuel in a partially liquefied state, and supplying the fuel to the reformer;
   a case member for encasing the fuel cell body and the reformer; and
   a refrigeration unit mounted to the case member for storing ambient air of the fuel tank that is cooled by latent heat of vaporization of the fuel, wherein the refrigeration unit comprises:
   a first body having a plurality of vent holes, and forming an accommodation space for accommodating the fuel tank;
   a second body connected with the first body, and forming a cool air storing space that can communicate with the first body; and
   a fan arranged within an aperture between the first and second bodies, the cooling fan to draw in air into the first body of the fuel cell system from an outside to warm the fuel tank while drawing air from the first body cooled by the fuel tank into the second body, the second body being the refrigeration unit.

18. The fuel cell system of claim 1, the second body of the refrigeration unit comprising air that is at a temperature below an outside temperature.

19. The fuel cell system of claim 1, the second aperture directly connecting the second body to the first body.

20. The fuel cell system of claim 1, further comprising a heat insulator arranged on an inner surface of the second body.

* * * * *